M. BIRKIGT.
MOTOR MECHANISM.
APPLICATION FILED MAY 31, 1917.
1,386,489.
Patented Aug. 2, 1921.
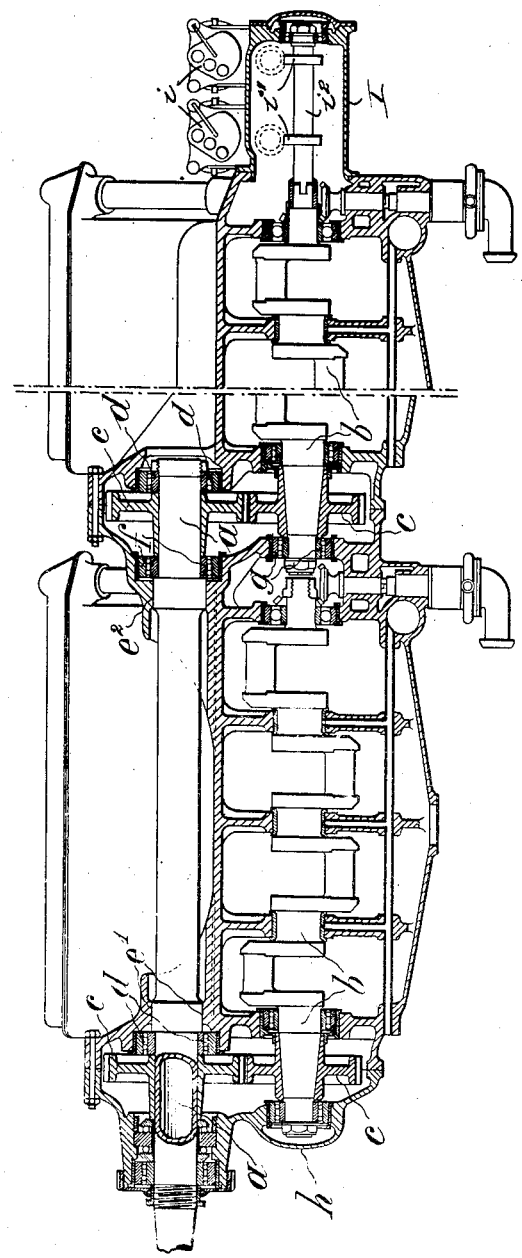
Witnesses
Inventor
Marc Birkigt
by
Attorney

UNITED STATES PATENT OFFICE.

MARC BIRKIGT, OF BOIS-COLOMBES, FRANCE.

MOTOR MECHANISM.

1,386,489.  Specification of Letters Patent.  Patented Aug. 2, 1921.

Application filed May 31, 1917. Serial No. 172,099.

*To all whom it may concern:*

Be it known that I, MARC BIRKIGT, citizen of the Republic of Switzerland, residing at Bois-Colombes, Department of Seine, France, have invented certain new and useful Improvements in Motor Mechanism, of which the following is a specification.

The invention relates to means for driving a single part by motor mechanism of a plurality of coupled engines, and more particularly for driving the propeller of an aeroplane by two, or a larger number of, coupled engines.

The invention comprises means in which the part to be driven is mounted on a counter shaft receiving its rotation from the main shaft through a plurality of pinions on the respective crank shafts of the several engines which are arranged one behind the other, and have their casings connected to one another to constitute in effect a unitary structure.

Apart from this main arrangement, the invention comprises other arrangements more explicitly referred to hereinafter.

The single figure of the drawing shows by way of example, in axial longitudinal section, a group of two internal combustion engines coupled together according to the invention.

The two engines, preferably V-engines are arranged one behind the other or in tandem relation so that their bearings for the counter shaft $a$ coincide. At the front end of the counter shaft which is adjacent to the first engine is mounted the propeller, and this counter shaft, whether it is composed of one piece, as shown, or a plurality of coupled sections, is connected by any suitable means to the second engine.

Preferably the engines used are those forming the subject matter of the U. S. patent application Serial No. 172,098 filed on the same day and in the same name for combined gun and engine for aerial machines, comprising a ball bearing $d$ in which rotates the counter shaft $a$, two cylindrical bearings $e^1$ $e^2$, the axes of which coincide with the extended axis of the counter shaft $a$ and which can be used for mounting the barrel of a gun on the said engine by making this shaft hollow.

The back of the casing of the first engine is provided outside with a ball bearing $f$, having the same axis as the counter shaft $a$ and with a ball bearing $g$ having the same axis as the crank shaft $b$ of the front engine; the back of the casing of the engine ahead incloses the joined structures of the two engines shown, and a cover $h$ is secured to the front of the casing of the foremost engine which cover carries also the bearing for the counter shaft $a$, and it is thus adapted to fit upon the front of the casing of the next engine to the rear in place of such a cover.

The back of the casing of the first engine is then fixed to the front end of the casing of the next engine to its rear, in place of a front cover such as that applied to the front engine. In this way the counter shaft $a$ will be formed in one piece, practically held parallel with the crank shafts of the engines, and may be as shown, or it may be composed of sections coupled together rigidly, since the two engines form a unitary structure; the counter shaft rotating both in the ball bearings $d$ and $f$ and in the bearings $e^1$ and $e^2$.

The crank shaft of the second engine may be disposed at 45° relatively to the crank shaft of the first engine, so as to distribute most effectively the effects of the impulses imparted to their crank shafts.

The magnetos $i$ for the two engines may be fitted on a housing I at the back of the rearmost engine, and driven from suitable gears $i'$ on the supplemental shaft $i^2$.

Obviously the invention is not limited to the constructions described but comprises any equivalent thereof within the scope of the claims.

Having now particularly described and ascertained the nature of my said invention and in what manner the same is to be performed, I declare that what I claim is:—

1. The combination of a plurality of engines arranged in tandem relation and having crank casings rigidly connected, the rear end of the casing of the first engine constituting a forward bearing of the crank shaft of the second engine, a counter shaft common to the said engines and adapted to be directly connected to a driven element, and means connecting the driving shafts of the engine individually to said common counter shaft for transmitting at all times the full power generated by the combined engines to the counter shaft.

2. The combination of a plurality of engines arranged in tandem relation and having crank casings rigidly connected, the rear end of the casing of the first engine constituting a forward bearing for the crank shaft of the second engine, a counter shaft common to said engines having a rear bearing in the casing of the second engine and adapted to be connected to a driven element, and means connecting the driving shafts of the engine individually to said common counter shaft for transmitting at all times the full power generated by the combined engines to said counter shaft.

3. The combination of a plurality of engines arranged in tandem and having unconnected crank shafts and rigidly connected casings, the rear end of the casing of the first engine constituting the forward end of the casing of the succeeding engine to provide a partition between the engines which is common to both casings, a counter-shaft common to said engines and adapted to be connected to a driven element, the counter-shaft being common to the said crank shafts and mounted in the casings of the engines and in parallelism with the crank shafts, means connecting the crank shafts of the respective engines to the said counter-shaft and at all times transmitting the full power generation of the combined engines to the said counter-shaft, ignition magnetos for the respective engines mounted in rear of the rearmost engine, and means for driving said magnetos from the rear end of the crank shaft of the rearmost engine.

4. The combination of a plurality of engines arranged in tandem relation and having unconnected crank shafts and rigidly connected casings, the rear end of the casing of the first engine constituting the forward end of the casing of the succeeding engine to provide a partition between the engines which is common to both casings, a counter shaft common to said engines and adapted to be connected to a driven element, the counter shaft being common to the said crank shafts and mounted in the casings of the engines in parallelism with the crank shafts, and means connecting the crank shafts of the respective engines to the said counter shaft for transmitting at all times the full power generated by the combined engines to said counter shaft.

5. The combination of a plurality of engines arranged in tandem relation having crank casings rigidly connected and separate crank shafts, a hollow counter shaft common to the said engines and adapted to be connected to a driven element and means connecting the crank shafts of the engines individually to said common counter shaft to transmit to said counter shaft at all times the full power generated by the combined engines.

In testimony whereof I have hereunto set my hand in presence of two subscribing witnesses.

MARC BIRKIGT.

Witnesses:
CHAS. P. PRESSLY,
PAUL PLUM.